United States Patent [19]

Poeppinghausen

[11] Patent Number: 4,853,242

[45] Date of Patent: Aug. 1, 1989

[54] PROCESS FOR PRODUCING A FISH FOOD

[75] Inventor: Klaus-Jürgen V. Poeppinghausen, Melle, Fed. Rep. of Germany

[73] Assignee: Warner-Lambert Company, Morris Plains, N.J.

[21] Appl. No.: 156,785

[22] Filed: Feb. 17, 1988

[30] Foreign Application Priority Data

Mar. 5, 1987 [DE] Fed. Rep. of Germany ....... 3707032

[51] Int. Cl.[4] ............................ A23P 1/00; A23K 1/18
[52] U.S. Cl. ......................................... 426/516; 426/1; 426/805
[58] Field of Search .................... 426/1, 72, 805, 516, 426/448

[56] References Cited

U.S. PATENT DOCUMENTS 3,931,414  1/1976  Popeil ..................................... 426/1

*Primary Examiner*—George Yeung
*Attorney, Agent, or Firm*—Ronald A. Daignault

[57] ABSTRACT

A process for producing a fish food is disclosed wherein a mixture containing 30% to 50% by weight crude protein, 5% to 15% fat and 0.5% to 10% crude fiber is extruded by means of a twin-screw conveyor at a speed of 200–250 rpm at a temperature of from 50° C. to 90° C. with the addition of 20 to 40 liters of water per hour and a throughput of 100–150 kg/hr to yield feed sticks with a length of from 10–25 mm and a diameter of 5–15 mm.

2 Claims, No Drawings

PROCESS FOR PRODUCING A FISH FOOD

BACKGROUND OF THE INVENTION

The present invention is concerned with food for ornamental or aquarium fish. More particularly, it is concerned with a stable foodstuff which can be placed in an aquarium tank for prolonged feeding of ornamental fish over a period of several days.

Owners of ornamental or aquarium fish face the problem of feeding the fish over periods when the owners are on holiday (vacation) or are otherwise away from home for periods of several days.

Feed masses for fish which are stable for a long time in water are known, but they generally suffer from a number of serious disadvantages. These so-called feed blocks or feed stones have an organic content of only 2.2% to 2.7% by weight, of which about only 1% by weight is crude protein. The remainder of the feed block consists of nonutilizable inorganic components, mainly calcium sulfate, which impair aquarium water.

When these feed blocks are used, a considerable increase in the calcium and sulfate ion concentrations occur in the aquarium water, both of which are objectionable with regard to the osmotic effects on ornamental fish. A consequence of prolonged feeding using these feed blocks is the considerable increase in conductivity of the aquarium water with attendant damage to the fish and aquarium plants and adulteration of the aquarium water. Therefore, these feed blocks or feed stones are unsuitable as sources of foodstuffs for aquarium fish.

SUMMARY OF THE INVENTION

It is therefore an object of the present invention to provide a mixed feed for ornamental fish which can be produced on a large scale and which continuously provides ornamental fish with nutrients during comparatively long holiday periods without impairing the quality of the aquarium water. In accordance with the present invention, there is provided a holiday feed for ornamental fish in the form of an extrudate comprising, by weight, 30% to 50% crude protein, 5% to 15% crude fat, 0.5% to 10% of crude fibers, and 5% to 15% moisture content.

DETAILED DESCRIPTION

The fish food according to the present invention has a good acceptance and provides the fish with water-insoluble nutrients over a comparatively long time. It remains stable in the water with regard to its binding ability and strength and, due to minimum water impairment, is not harmful to the fish or aquatic plants.

In a preferred embodiment, the fish food of the present invention comprises at least 40% by weight crude protein and at least 8% by weight crude fat, a maximum of 3% by weight fibrous materials, and 8% by weight residual moisture.

Such a fish food can be obtained by combining 15% to 35% by weight gluten, 15% to 35% by weight kaolin, 5% to 25% by weight alfalfa meal, 5% to 20% by weight casein, 5% to 20% by weight krill, 1% to 10% by weight soya oil, 2% to 8% by weight cement, 1% to 10% by weight milk protein, 1% to 10% natural rubber, 5% to 15% by weight water, and, optionally, additional vitamins, trace elements, conventional coloring and/or aroma materials and/or conventional preservatives such as calcium propionate or butylated hydroxytoluene.

The present invention also provides a process for the production of the above-described holiday fish food which comprises (a) stirring the above-mentioned raw materials to produce a paste, (b) extruding the paste by means of a twin screw conveyor at 200 to 250 rpm (preferably at 235 rpm) at a temperature of between about 50° C. to 90° C. (preferably at about 70° C.), with the addition of from 20 to 40 liters of water per hour (preferably about 29 liters per hour), with a throughput of 100 to 150 kg/hour (preferably about 125 kg/hour), to give feed sticks with a length of 10 mm to 25 mm (preferably 15 mm to 20 mm), and a diameter of 5 mm to 15 mm (preferably about 8 mm).

The extrudate fish food sticks produced in this manner initially float on the surface of the aquarium water or are suspended in the water, sinking after some hours. In this way, the holiday fish food of this invention is accessible at all levels for almost all types of ornamental fish. The food is acceptable to the commonest types of fish, such as Luricaria, neon salmon, jewelled salmon, thick-lipped thread fish, small rainbow wrasse, wedge-flecked barbel, zebra barbel, platys, ruby barbel and luxury barbel.

The following production example and feeding experiments are given for the purpose of illustrating the present invention.

EXAMPLE 1

Production of Holiday Fish Food

The following materials are mixed and fed into a Creusot-Lorire twin-screw conveyor and extruded at a speed of rotation of 235 rpm and a temperature of 70° C. with the addition of 24 liters of water over the course of 50 minutes to provide sticks with a length of 15 mm to 20 mm and a diameter of 8 mm:

(a) 22.9 kg gluten
(b) 21 kg kaolin
(c) 15 kg alfalfa meal
(d) 12.5 kg casein
(e) 10 kg krill
(f) 4.99 kg soya bean oil
(g) 4,5 kg cement
(h) 4.1 kg milk protein
(i) 3 kg natural rubber
(j) 1 kg natural carotenoids
(k) 600 g dyestuff E 172
(l) 400 g calcium propionate
(m) 15 g butylated hydroxytoluene

FEED EXPERIMENTS

Example 2

In order to determine the optimum amount to be provided, the holiday food sticks prepared as described in Example 1 were supplied in different amounts to the above-mentioned ornamental fish. In some cases, the amount of food provided exclusively as holiday food sticks was four times the amount which normally suffices for feeding. During the whole of the experimental feeding period of up to two months, there were no losses of fish in spite of the excessive feeding and the water loading which resulted therefrom.

Example 3

In a further experiment, Luricaria and apple snails were fed for four months exclusively with the holiday feed according to the present invention. In this experiment also, no losses occurred.

On the basis of these experiments, it can be seen that the holiday fish food of this invention is suitable for the sole nutritional source for ornamental fish even over comparatively long periods of time.

In the case of an average fish occupancy in a 40 to 100 liter aquarium, 9 to 12 sticks, corresponding to 7 to 9 g of feed, are sufficient for about 1 week as a holiday feed.

In an aquarium equipped with a good, biologically-active filter system with a foamed-material capsule, under the conditions of the feeding experiments, only 0.5 mg/liter of nitrites and 0.2 mg/liter of ammonia were observed as maximum concentrations of harmful materials.

I claim:

1. A process for the production of a fish food, said process comprising the steps of:
   (a) mixing
   (1) 15% to 35% by weight gluten,
   (2) 15% to 35% by weight kaolin,
   (3) 5% to 25% by weight alfalfa meal,
   (4) 5% to 20% by weight casein,
   (5) 5% to 20% by weight krill,
   (6) 1% to 10% by weight soya oil,
   (7) 2% to 8% by weight cement,
   (8) 1% to 10% by weight milk protein,
   (9) 1% to 10% by weight natural rubber,
   (10) vitamins and trace elements,
   (11) coloring and aroma materials,
   (12) preservatives;
   (b) extruding the mixture formed in Step (a) by means of a twin-screw conveyor at a speed of 200-250 rpm at a temperature of from 50° C. to 90° C. with the addition of 20 to 40 liters of water per hour and a throughput of 100-150 kg/hr;
   to yield feed sticks with a length of from 10-25 mm and a diameter of 5-15 mm.

2. A process as defined by claim 1 wherein a mixture of 22.9% by weight gluten, 15% by weight alfalfa meal, 12.5% by weight casein, 10% by weight krill, 5% by weight soya oil, 4.5% by weight cement, 4.1% by weight milk protein, 3% by weight natural rubber, and vitamins, trace elements, coloring and aroma materials, and preservatives is mixed and extruded by means of a twin-screw conveyor at 235 rpm and at a temperature of 70° C. with the addition of 29 liters of water per hour to give feed sticks with a length of 15 mm to 20 mm and a diameter of 8 mm.

* * * * *